UNITED STATES PATENT OFFICE.

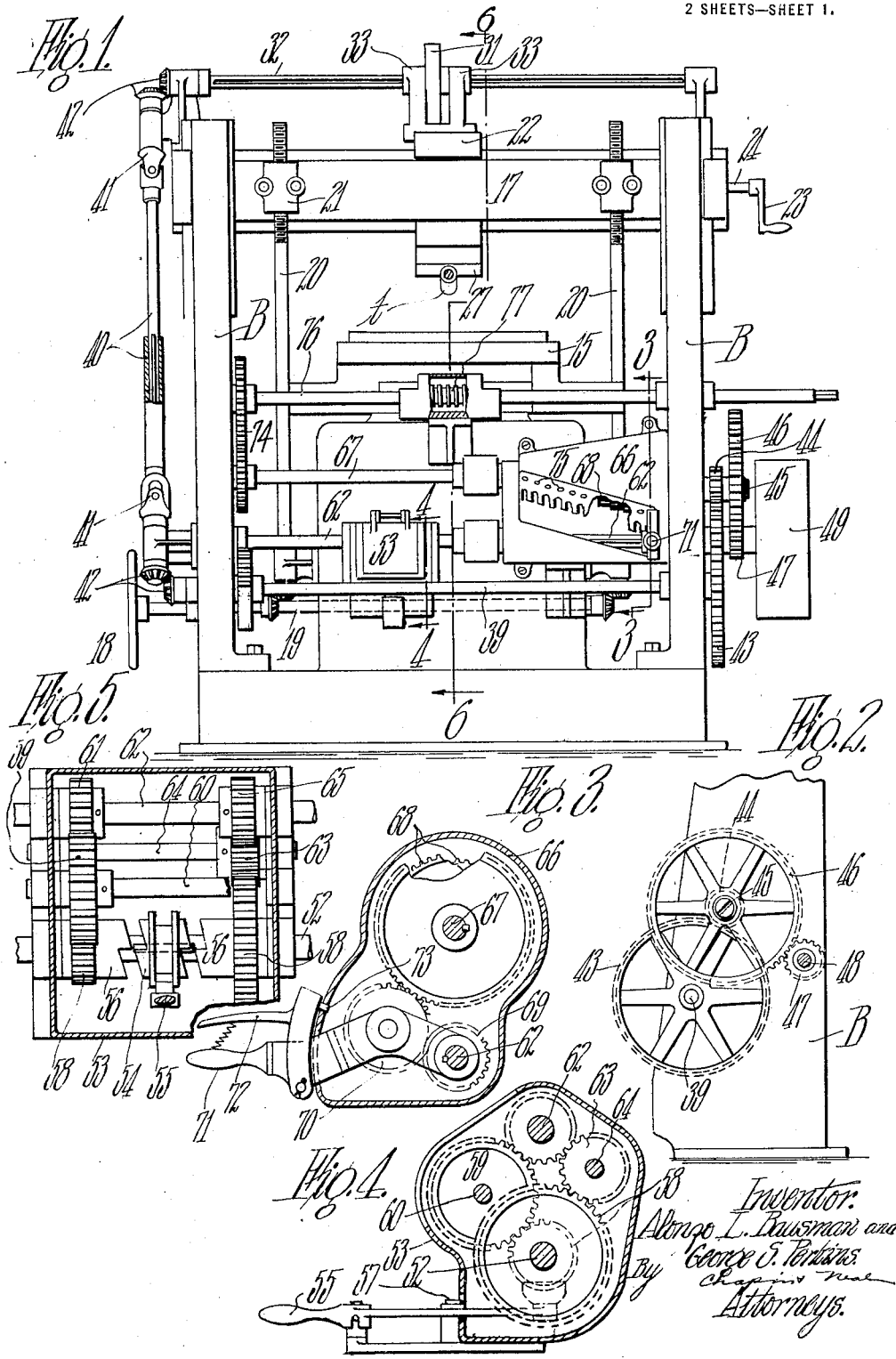

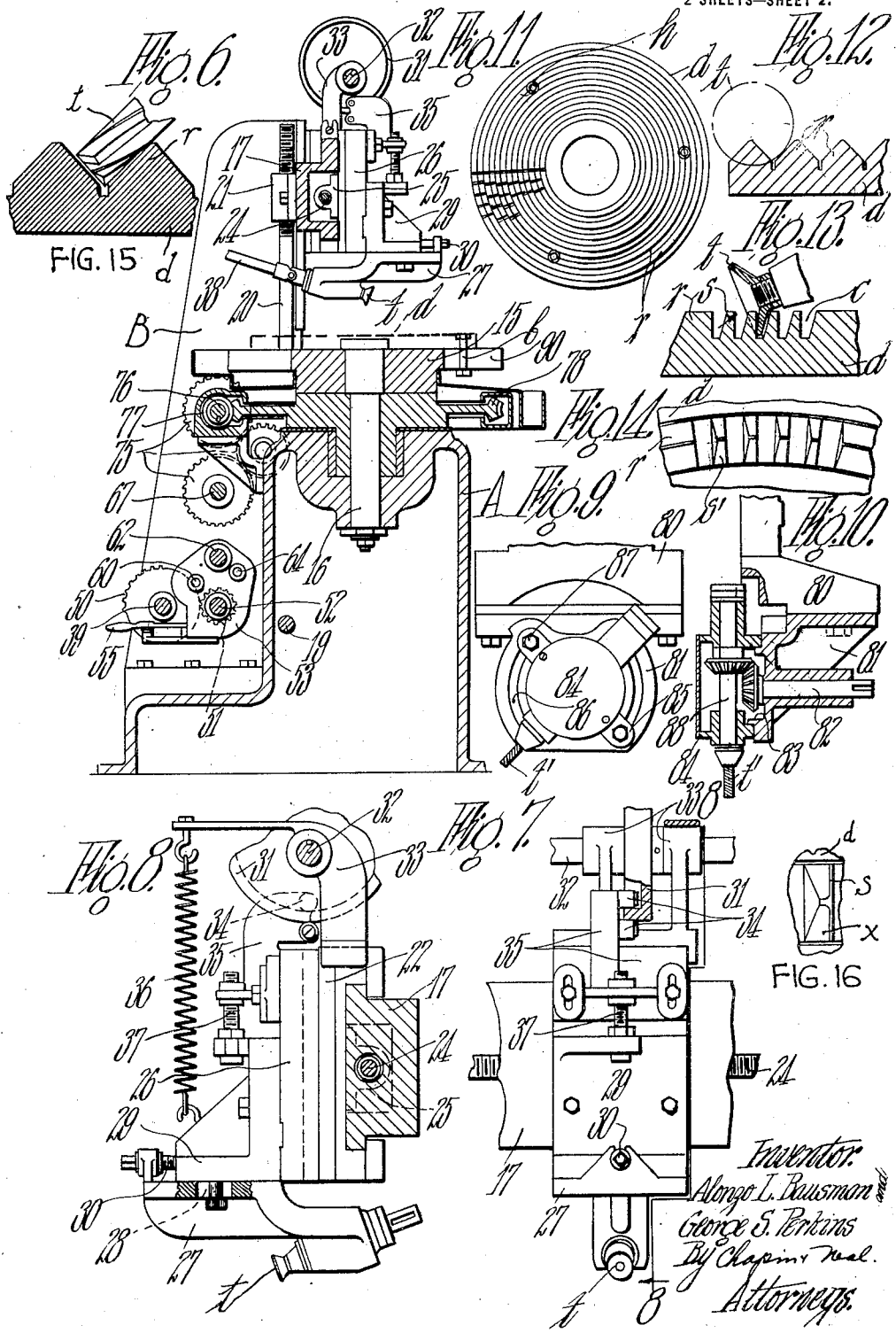

ALONZO LINTON BAUSMAN, OF CHICOPEE, AND GEORGE SIMPSON PERKINS, OF SPRINGFIELD, MASSACHUSETTS, ASSIGNORS TO NATIONAL EQUIPMENT COMPANY, OF SPRINGFIELD, MASSACHUSETTS, A CORPORATION OF MASSACHUSETTS.

MILLING-MACHINE.

1,341,252.   Specification of Letters Patent.   Patented May 25, 1920.

Application filed April 17, 1919. Serial No. 290,722.

*To all whom it may concern:*

Be it known that we, ALONZO LINTON BAUSMAN and GEORGE S. PERKINS, citizens of the United States of America, residing at Chicopee and Springfield, respectively, in the county of Hampden and State of Massachusetts, have invented certain new and useful Improvements in Milling-Machines, of which the following is a specification.

This invention relates to improvements in milling machines and more particularly to machines for forming teeth in the faces, as distinguished from the peripheries, of disks.

The machine of this invention, is in its present embodiment, adapted as a convenient means for use in forming the disks used in reducing or refining apparatus. One type of disk, commonly used in such apparatus, is provided with a plurality of concentric rows of approximately V-shaped ridges on one face thereof, and each of such ridges are subdivided into a circular series of teeth by substantially radial milling cuts. Examples of disks, of the character referred to, will be found in U. S. Letters Patent No. 992000, granted May 9, 1911, on an invention of Theodor Kihlgren, and in U. S. Letters Patent No. 1,203,461, granted October 31, 1916, on an invention of Alonzo Linton Bausman. These teeth are subsequently "backed off" by other milling operations to complete the disks.

Disks of this character are not readily and conveniently handled in milling machines of the ordinary type. Such machines are adapted more particularly for operating upon the periphery of the disk, as for forming gear teeth and so forth. The operations necessary for finishing disks, of the general character above described, more nearly resembles the operation of cutting the teeth on a crown gear, and such gears are infrequently used and the standard milling machines and gear cutters have not had to be adapted for this purpose. While it may be possible to form the teeth in these disks in certain types of milling machines, the operations cannot be as conveniently accomplished nor as rapidly as with the machine of the present invention.

This invention has for its broad object the provision of a special machine for conveniently and rapidly performing operations of the special character described.

More particularly, it is an object of the invention to provide an intermittent and automatically movable work support which is movable about a vertical axis and indexing mechanism to control the angular extent of the steps of movement and vary such steps as required for the different concentric rows of ridges to be cut, together with a cross rail above the support and a tool carrying slide which is automatically movable toward the support while the latter is at rest and movable away from the support while the latter is in motion.

Another object of the invention is to provide in a machine of the class described generally improved mechanical structure.

Other objects and advantages will appear in the following description and in the illustrative embodiment of the invention in the accompanying drawings, in which:

Figure 1 is a front elevational view of a machine embodying the invention;

Fig. 2 is a fragmentary side elevational view thereof;

Fig. 3 is an enlarged cross sectional view taken on the line 3—3 of Fig. 1 and showing one of the gear boxes;

Fig. 4 is a similar view taken on the line 4—4 of Fig. 1 and showing the other gear box;

Fig. 5 is a sectional elevation of the gear box shown in Fig. 4;

Fig. 6 is a sectional elevation taken on the line 6—6 of Fig. 1;

Fig. 7 is an enlarged fragmentary elevational view showing the tool mounting;

Fig. 8 is a cross sectional view taken on the line 8—8 of Fig. 7;

Figs. 9 and 10 are fragmentary front elevational and cross sectional views respectively of an attachment for the tool supporting slide;

Fig. 11 is a plan view of a disk, which is adapted to be formed with teeth by the machine;

Figs. 12, 13 and 14 are detail views illustrative of the manner of forming the teeth; and Figs. 15 and 16 are detail views illustrative of the manner of "backing off" the teeth.

Referring to these drawings; the machine includes a central pedestal A and a horizontal work support 15 which is revoluble about a vertical axis, the support 15 being fixed to a shaft 16 rotatably supported in pedestal A. On each side of the latter are upstanding standards B which are connected together near their upper ends by a cross rail 17. The latter, however, is vertically slidable on the standards B, as indicated in Fig. 1, and is manually movable by a hand wheel 18, which is fixed to a horizontal shaft 19. The latter is connected by bevel gearing to simultaneously turn two spaced vertical shafts 20, which near their lower ends are rotatably supported and held against axial movement in suitable bearings on pedestal A. The upper ends of shafts 20 are threaded to engage nuts 21 fixed to the cross rail 17. Slidable horizontally on the latter is a carriage 22 which may be manually moved by turning a crank handle 23 fixed on a shaft 24. The latter is suitably journaled in and held against axial movement relatively to the cross rail 17 and is threaded to engage and move a nut 25, (Fig. 8), fixed to the carriage 22.

Mounted for vertical movement on the carriage 22 is a slide 26 which carries the cutting tool to operate on the work held on support 15. As shown, the tool $t$ is rotatably supported in a bracket 27, which in turn is secured by a bolt and slot connection 28 to a second bracket 29 fixed to slide 26. The connection 28 permits adjustment of the tool $t$ in a horizontal direction with respect to slide 22, a screw 30 being provided to facilitate the movement of bracket 27 and thus of tool $t$. Thus, tool $t$ may be adjusted relatively to work support 15 in three directions by manipulation of the members 18, 23 and 30.

The tool $t$ having once been set by aid of the adjustments described, is automatically moved toward and away from the work support. This is accomplished by a cam 31 which is slidably keyed to a shaft 32 supported by the standards B. Cam 31 is held axially by and between a pair of brackets 33 secured to the carriage 22 and its rim portion engages between a pair of rolls 34 mounted on a bracket 35 which is secured to the slide 26. The rim of cam 31 closely fits between rolls 34 and so is operable to positively move slide 26 in both directions. A spring 36 connects the bracket 29 and an extension of one of the brackets 33 and acts to take up such clearance as may exist between the rolls and cam. The bracket 35 is adjustably fixed to slide 26, as indicated in Fig. 7, and a screw 37 connects such bracket to the bracket 29 so that the tool $t$ may be adjusted vertically with respect to cam 31.

The tool $t$ is driven continuously from a suitable source of power by means of a shaft 38, which is flexibly connected with tool $t$ as indicated in Fig. 6, so as to permit the desired vertical and horizontal adjusting movements without interfering with the driving function.

The cam 31 is driven from the shaft 32 which in turn is driven from a second horizontal shaft 39 by means including telescoping shaft sections 40, universal joints 41 and bevel gearing 42, so that the shaft 32 may be uninterruptedly driven even though it is from time to time moved toward or from its driving shaft 39 by the movement of cross rail 17. Shaft 39 is rotatably mounted in standards B and carries on one end a gear 43 which meshes with a pinion 44 on a stud 45. Movable with pinion 44 is a gear 46, which is driven by a pinion 47 on the main power shaft 48 of the machine, such shaft being driven from a suitable source of power by the pulley 49.

The work support 15 is driven intermittently in the following manner. The shaft 39 carries a mutilated gear 50, (Fig. 6) which intermittently drives a pinion 51 fixed on a shaft 52 which lies directly in back of shaft 39 and therefore does not appear in Fig. 1. Shaft 52 passes through a gear box 53 which is best shown in Figs. 4 and 5. Slidably keyed to shaft 52 and located centrally in the gear box 53, is a clutch element 54, which is movable, by means of a lever 55, to engage with either of two spaced clutch elements 56, mounted to turn loosely on shaft 52. Lever 55 is pivoted at 57 and may be held in either of its two positions by suitable means as indicated in Fig. 4. Each element 56 carries a gear 58 and one of these gears meshes with a gear 59 on an idler shaft 60 which gear 59 meshes with a gear 61 on a driven shaft 62. The other gear 58 drives a gear 63 carried by a second idler shaft 64, and gear 63 drives a pinion 65 fixed on the driven shaft 62.

The shaft 62 passes through a second gear box 66 and above shaft 62 and also extending into box 66, is a driven shaft 67. On the latter are fixed a large number of gears 68, of graded diameter and any one of these gears may be driven by a gear 69 which is slidably keyed to shaft 62. Gear 69 constantly meshes with an idler gear 70 mounted in a lever 71 and the gear 70 directly engages the desired gear 69. The inner end of lever 71 is forked, as indicated in Fig. 3, and in this forked portion the gears 69 and 70 are positioned so that they may be moved axially of shaft 62 by the lever. The latter has associated therewith a small lever 72, the inner end of which presents a pin 73 which may engage in any of a plurality of holes 74 in gear box 66. There is a hole 74 for each gear 68 and the pin 73, when inserted in a hole 74, holds lever 71 in such position that the gear 70 meshes with the selected gear 68. The driven shaft 67 is connected by gearing 75 (Fig. 1) with a parallel shaft 76 which is rotatably mounted in the standards B. On shaft 76 is a worm 77 which drives a worm gear 78 (Fig. 6) fixed on the described shaft 16.

In forming the teeth on the disk shown in Fig. 11, the tool $t$ is used but in order to "back off" these teeth a different tool is employed all as will later appear in detail. This second tool, conventionally shown at $t'$ as a cylindrical milling cutter in Figs. 9 and 10, requires a somewhat different mounting which will now be described. This mounting includes a bracket 80 which is adapted for connection to slide 26 in the same manner as described in connection with the bracket 29 and is substituted for the latter. Secured to bracket 80 is a second bracket 81, in which is journaled a drive shaft 82 adapted to connect with and be driven from the described shaft 38. Bracket 81 has a circular flange 83 concentric with shaft 82 and adapted to rotatably receive a casing 84. The latter has lugs 85 which overlie curved slots 86 in bracket 81 and are adapted to be held to the latter in various positions of angular adjustment by bolts 87. Mounted in and extending diametrically through the casing 83, is a shaft 88 which is connected by the bevel gearing, shown in Fig. 10, with the described shaft 82. The lower end of shaft 88 carries the tool $t'$; which can, according to the structure described, be moved to various angular positions without disturbing its driving connection with shaft 82.

The operation of the machine will be described in connection with the work, which it in its present illustrative embodiment, is adapted to perform. Referring to Fig. 11, $d$ is a circular disk which is provided on one face with a plurality of concentrically arranged circular ridges $r$ of substantially V-shaped cross section (Fig. 12). Each row $r$ is adapted to be subdivided into a plurality of equally spaced teeth $s$ by milling cuts $c$ which are performed by the tool $t$ illustrated in Fig. 13. The disk $d$ is suitably secured to the support 15. For example, the disks usually have a series of holes $h$ through which bolts $b$ may be passed. Slots 90 are provided in the work support 15 to receive such bolts and the holes $h$ are counterbored so that the heads of bolts $b$ will lie below the bottoms of the ridges $r$. The cross rail 17 is then moved to the desired vertical position so that the tool $t$ (which is always moved a predetermined distance by cam 31) will be lowered into the ridges $r$ for the desired distance, for example as indicated in Fig. 12. The last small increments necessary to secure this vertical setting of tool $t$ may be obtained by the screw 37, if desired. The carriage 26 is next adjusted by turning handle 23 until tool $t$ is brought vertically above the first ridge $r$ to be cut.

The operator then selects, by means of lever 71, the desired gear 68, which for the given row will, on one revolution of shaft 70 39, turn the work support 15 through the necessary angle to effect the desired spacing of the teeth $s$. A large number of these gears 68 are provided in graded sizes so that the various angular steps necessary to effect the desired tooth spacing on the different rows $r$ may be obtained. In order, however, to avoid the necessity for an unduly large number of the gears 68, the second gear box 53 is provided as a means for connecting the shafts 39 and 62. In one position of lever 55, the shafts 39 and 62 are driven at equal speeds which, with the lever 55 in the other position, the shaft 62 is driven at a higher speed, say for example at twice the speed of shaft 39. The effect then of the gear box 53 is to double the range afforded by the gears 68. For example a gear 68 having 120 teeth is, when the shaft 62 is driven at double the usual speed the equivalent of a gear having 60 teeth. It may also happen that one gear 68 produces an angular movement of the work support which is larger than desired while the next larger gear will produce too small a movement. In such case the desired movement may be obtained by a much larger gear 68, which when shaft 62 is driven at double speed, will be the equivalent of a gear of a size intermediate the two first named gears. Thus, if a 70 tooth gear produced too great a movement and the next larger gear, say of 80 teeth, produced too small a movement, a 150 tooth gear, with shaft 62 driven at double speed, would accomplish the desired result.

Having made the adjustments described, the machine is started and continues automatically until one row $r$ is completely milled. The tool $t$ is continuously revolved and, since shaft 32 is continuously driven, the tool $t$ continually reciprocates. Due to the mutilated gear 50, the work support is moved only when the tool $t$ is out of engagement with the work and is held stationary at all other times. Thus, the tool $t$ makes one cut $c$ and as soon as it has withdrawn from the cut, the work support is moved one step and comes to rest to permit the next tooth to be cut. After one row $r$ has been cut, the tool $t$ is moved by handle 23 into position for operation on another row and the gear shift levers 55 or 71 are manipulated to "index" the work support for this row. Succeeding rows are cut in a like manner.

After the teeth $s$ are cut, it is necessary to back them off and for this operation the device shown in Figs. 9 and 10 is substituted, as described, for the parts 27 and 29. The tool $t'$ is adjusted in a manner similar to tool $t$ except that it is tilted by the adjusting means 86 and 87 so that its cutting edge (formed on its periphery) lies parallel with one of the inclined sides of the teeth. By the use of tool $t'$ the sides $s'$ of the teeth $s$ are backed off. This "backing off" operation is performed first on one side of one row and then on the other so that each row $r$ is gone over twice with the same indexing of the work support. The tool $t'$, having been adjusted as described, is so adjusted that it will overlie the sloping edge of each tooth $s$, as the latter comes to rest. Then when tool $t'$ is automatically lowered, it makes the cut $x$, removing a slight amount of metal from the sloping sides of tooth $s$ back of its cutting each to provide the usual clearance space.

An important feature of the invention consists in the provision of the horizontally disposed work support, which affords the most convenient arrangement for receiving and supporting the large and heavy disks $d$. The spaced standards B provide for supporting the cross rail 17 in operative relation with and above the work support 15 and yet permit free and convenient access to the work support for the operations of locating and removing the work therefrom. The provision of the cross rail is important as affording the wide range of traverse for the cutting tool over the entire face of the large disks. The automatic feeding of the tool toward and away from the face of the work support, as distinguished from a radial automatic feeding movement, is important for work of the character described for a radial feed necessitates cutting across all the rows $r$ in a radial line, whereas the teeth $s$, being of equal spacing in each row, are necessarily staggered in adjacent rows. The arrangement of the cross rail so that the tool $t$ may be moved diametrically across the face of the circular work support is also important for otherwise the tool $t$ could not reach all of the many concentric rows of ridges $r$.

The invention has been disclosed herein in an embodiment at present preferred for the purposes of illustration but the scope of the invention is defined by the appended claims rather than by the foregoing description.

What we claim is—

1. In a machine of the character described, a revoluble work support, mechanism to intermittently turn said support, a cross rail supported to parallel the face of said support, a carriage slidably mounted on the cross rail, a tool carrying slide on the carriage, said rail being so located that the tool may traverse the face of said support substantially diametrically on movement of said carriage, manually operable means to move the latter on the cross rail, and automatic means to feed said slide toward and away from the face of said support.

2. In a machine of the class described, a central frame member, a work support revolubly mounted therein, spaced members arranged one on each side of the first named member and parallel with the axis of said support, a cross rail bridging said last named members and slidably supported at its ends on the latter, means to move the cross rail toward or away from the face of said support, a carriage slidable on the cross rail in a direction parallel with the face of said support, a tool carrying slide on the carriage, automatic means to move the slide axially toward and away from the work support, means to intermittently move the latter, and mechanism to coördinate the actuating means for the slide and work support so that the latter is moved after the withdrawal of the tool from the work on said support and before it again enters the work.

3. In a machine of the character described, a revoluble work support, a cross rail supported to parallel the face of said support, a carriage slidable on the cross rail in a direction parallel to the face of said support, a tool carrying slide mounted on the carriage to move toward and away from the face of said support, continuously operable mechanism to reciprocate said slide, variable speed driving means for the work support, and means connecting said mechanism and driving means to intermittently turn the work support during the latter part of the movement of the slide away from said support and the first part of its movement toward the latter.

4. In a machine of the character described, a revoluble work support, spaced uprights arranged one on each side and parallel to the axis thereof, a cross rail slidably supported on said uprights for movement toward and away from the face of said support, a carriage slidable on the cross rail in a direction parallel to the face of said support, a tool carrying slide mounted on said carriage for movement toward and away from the face of said support, a shaft mounted on said cross rail, a cam slidable on the shaft and revoluble thereby to reciprocate said slide, means on the carriage to hold said cam against relative axial movement, and driving means for said shaft arranged to permit movement of said cross rail toward or away from said support.

ALONZO LINTON BAUSMAN.
GEORGE SIMPSON PERKINS.